(12) United States Patent
Napp

(10) Patent No.: US 11,491,701 B2
(45) Date of Patent: Nov. 8, 2022

(54) METHOD FOR PRODUCING A TUBULAR BODY WITH REDUCED INTERNAL STRESS BY USING 3D PRINTING, AND A TUBULAR BODY WITH REDUCED INTERNAL STRESS

(71) Applicant: Airbus Defence and Space GmbH, Taufkirchen (DE)

(72) Inventor: Christian Napp, Achim (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 16/275,010

(22) Filed: Feb. 13, 2019

(65) Prior Publication Data
US 2019/0263050 A1 Aug. 29, 2019

(30) Foreign Application Priority Data
Feb. 28, 2018 (DE) .......................... 102018104513.1

(51) Int. Cl.
*B29C 64/10* (2017.01)
*B33Y 10/00* (2015.01)
(Continued)

(52) U.S. Cl.
CPC .............. *B29C 64/10* (2017.08); *B22F 5/009* (2013.01); *B22F 5/106* (2013.01); *B22F 10/20* (2021.01);
(Continued)

(58) Field of Classification Search
CPC ....... B29C 64/10; B29C 64/153; B22F 10/00; B22F 5/106; B22F 5/009; B22F 2005/005;
(Continued)

(56) References Cited

U.S. PATENT DOCUMENTS 4,647,326 A * 3/1987 Pott ...................... B29D 24/005
156/77
4,731,280 A 3/1988 Geisseler
(Continued)

FOREIGN PATENT DOCUMENTS

EP 0233339 A1 8/1987
EP 2647942 A1 10/2013
(Continued)

OTHER PUBLICATIONS

European Office Action from corresponding European Patent Application No. 19155874.1 dated Jan. 21, 2021.
(Continued)

*Primary Examiner* — James M Hewitt, II
(74) *Attorney, Agent, or Firm* — Greer, Burns & Crain, Ltd.

(57) ABSTRACT

A method for producing a tubular body with reduced internal stress uses 3D printing. The tubular body has an outer wall with a stiffening structure extending along at least part of the outer wall. The method sets a printing plane for 3D printing with a 3D printer, and prints a tubular body layer in the printing plane with the 3D printer. The tubular body layer has an outer wall layer and a stiffening structure layer extending in the printing plane along a periphery of the outer wall layer. The stiffening structure layer has at least two portions spaced apart from one another. The method produces an outer wall with a stiffening structure for a tubular body with reduced internal stress.

9 Claims, 4 Drawing Sheets

(51) Int. Cl.
*B33Y 80/00* (2015.01)
*F16L 9/00* (2006.01)
*B22F 5/10* (2006.01)
*B22F 5/00* (2006.01)
*B29C 64/153* (2017.01)
*F02C 7/22* (2006.01)
*B22F 10/20* (2021.01)
*B29L 23/00* (2006.01)

(52) U.S. Cl.
CPC ............ *B29C 64/153* (2017.08); *B33Y 10/00* (2014.12); *B33Y 80/00* (2014.12); *F02C 7/222* (2013.01); *F16L 9/00* (2013.01); *B22F 2005/005* (2013.01); *B29L 2023/22* (2013.01)

(58) Field of Classification Search
CPC ......... F02C 7/222; B33Y 10/00; B33Y 80/00; F16L 9/00; F16L 9/02; F16L 9/128; B29L 2023/22; Y02P 10/25; B29D 23/001
See application file for complete search history.

(56) References Cited

U.S. PATENT DOCUMENTS

| | | | |
|---|---|---|---|
| 2016/0061381 A1* | 3/2016 | Kotliar | B22F 3/1055 138/39 |
| 2016/0297509 A1* | 10/2016 | Estadieu | B29D 24/005 |
| 2017/0219134 A1* | 8/2017 | Kedor | B22F 3/1055 |
| 2018/0186058 A1* | 7/2018 | Busgen | B29C 51/02 |

FOREIGN PATENT DOCUMENTS

| | | | |
|---|---|---|---|
| EP | 2907603 A2 | 8/2015 | |
| EP | 3086011 A1 * | 10/2016 | ............ B64D 15/04 |
| WO | 2015042089 A1 | 3/2015 | |
| WO | 2015048374 A1 | 4/2015 | |
| WO | 2018005889 A2 | 1/2018 | |

OTHER PUBLICATIONS

German Office Action from corresponding German Patent Application No. 102018104513.1 dated Oct. 24, 2018.

* cited by examiner

METHOD FOR PRODUCING A TUBULAR BODY WITH REDUCED INTERNAL STRESS BY USING 3D PRINTING, AND A TUBULAR BODY WITH REDUCED INTERNAL STRESS

CROSS-REFERENCE TO PRIORITY APPLICATION

This application claims the benefit of, and priority to, German patent application number DE 102018104513.1, filed Feb. 28, 2018. The content of the referenced application is incorporated by reference herein.

TECHNICAL FIELD

Embodiments of the subject matter described herein relate generally to a method for producing a tubular body with reduced internal stress by using 3D printing, to a tubular body with reduced internal stress, and to an aircraft.

BACKGROUND

Additive Layer Manufacturing (ALM) or 3D printing (three-dimensional printing) is being used increasingly frequently in aircraft construction. In the case of some types of aircraft, this applies in particular to fuel manifolds, which have previously been produced in an expensive casting or welding process. In the case of larger components, measuring about 400 mm in one direction, however, 3D printing causes great internal stresses, which deform the component during the printing, so that cracks are produced and the printed component possibly ruptures.

In order to reduce the internal stress during production, it is known to optimize the alignment of the components in the printing chamber. In the case of larger components, however, the entire printing chamber is used, so that it is not possible to optimize the alignment of the component.

BRIEF SUMMARY

The object of the disclosure is therefore to provide a method that avoids damage to the tubular bodies during their production.

The object is achieved by the features of the independent claims. Advantageous developments are the subject of the dependent claims and of the description that follows.

According to the disclosure, a method for producing a tubular body with reduced internal stress by using 3D printing is provided, the tubular body having an outer wall with a stiffening structure, the stiffening structure extending along at least part of the outer wall, wherein the method comprises the following steps: a) setting a printing plane for 3D printing by means of a 3D printer; b) printing a tubular body layer in the printing plane by means of the 3D printer, the tubular body layer having an outer wall layer and a stiffening structure layer, the stiffening structure layer extending in the printing plane along a periphery of the outer wall layer, and the stiffening structure layer having at least two portions, which are spaced apart from one another; c) repeating steps a) and b) to produce an outer wall with a stiffening structure for a tubular body with reduced internal stress.

The disclosure consequently provides a method for producing a tubular body, the tubular body being produced by 3D printing, that is to say an ALM process. In this case, the tubular body is produced layer by layer from a number of tubular body layers. A tubular body layer may in this case be applied for example in a printing plane of the 3D printer either on another previously applied tubular body layer or as a first tubular body layer on a printing platform of the 3D printer. The tubular body layer in this case comprises an outer wall layer and a stiffening structure layer. The outer wall layer forms a layer of the outer wall of the tubular body. The stiffening structure layer forms a layer of a stiffening structure which is arranged on the outer wall and is connected to it. In this case, the stiffening structure layer has at least two portions, which are spaced apart from one another, i.e. they are not directly connected to one another. A connection of the two portions of the stiffening structure layer may however be produced indirectly by way of the outer wall layer by which the two portions of the stiffening structure layer may be connected. The stiffening structure layer is consequently of a multi-part construction. The multi-part stiffening structure layer has the effect that the outer wall layer has a reduced internal stress. Consequently, the outer wall formed by a number of outer wall layers also has a lower internal stress. The low internal stress means that cracks on the outer wall during the printing and thereafter are avoided. Furthermore, the thickness of the outer wall can be reduced, since the stiffening structure strengthens the outer wall. This brings about a reduction in the weight of the tubular body, which is important in particular in the case of aircraft components.

Advantageously, the outer wall layer and the stiffening structure layer are in one piece.

The outer wall layer and the stiffening structure layer thereby form an uninterrupted, unitary tubular body layer. The tubular body layer can consequently also be seamless, i.e. it does not have a seam between the outer wall layer and the stiffening structure layer but instead a seamless transition. The outer wall layer and the stiffening structure layer can consequently be printed or produced together in one step.

It is also advantageous if a number of stiffening structure layers form a stiffening structure which extends around the outer wall outside the tubular body.

Expediently, a number of stiffening structure layers form a stiffening structure which forms a rib-like network structure, which is preferably hexagonal, more preferably irregularly hexagonal.

It is advantageously also provided that step b) comprises the following substep: b1) printing the tubular body layer from metal, preferably titanium.

If the tubular body layer is printed from metal, then the tubular body also accordingly consists of metal. Consequently, tubular bodies can be produced from metal without an internal stress destroying the tubular body during the production process. It is possible in this way to provide at low cost metallic tubular bodies that are stiffened and only have low internal stress, whereby the stability of the tubular bodies is increased. It is also possible in this way to avoid a possibly complex repair of the metallic tubular body.

It may advantageously also be provided that step b) comprises the following substep: b2) printing the tubular body layer from plastic, preferably polyetheretherketone (PEEK) or polyetherimide (PEI).

This avoids deformation processes of the tubular body produced from plastic and provides a tubular body of plastic that is stiffened and has low internal stress.

Advantageously, step c) may comprise the following substep: c1) repeating steps a) and b) until a first tubular body layer is at a distance from a last tubular body layer of between 50 mm and 1000 mm, preferably between 300 mm and 800 mm, more preferably between 350 mm and 600 mm, most preferably 400 mm.

This allows the production of tubular bodies that have large dimensions and therefore cannot be arranged in a 3D printer in an alignment that is optimized for the reduction of internal stress.

It may also be expedient if step a) comprises the following substep: a1) setting a printing plane for 3D printing by means of a laser 3D printer.

By means of a laser 3D printer, tubular bodies can be produced in an effective and efficient way. Especially tubular bodies of metal can be formed quickly and easily by means of laser 3D printers.

According to the disclosure, a tubular body may also be provided, produced by a method according to the description given above, the tubular body having: an outer wall and a stiffening structure, the stiffening structure extending along at least part of the outer wall, the stiffening structure being formed by at least one stiffening structure layer and the outer wall being formed by at least one outer wall layer, the stiffening structure layer extending along a periphery of the outer wall layer, the stiffening structure layer having at least two portions, which are spaced apart from one another.

The advantages and developments of the tubular body according to the disclosure correspond to the advantages and developments that have been given above in the description of the method. Reference is accordingly made to the description given above.

Advantageously, the tubular body is a manifold.

Due to the surfaces with curvatures in two directions, manifolds especially tend to have internal stresses, which can be reduced by the disclosed method.

According to the disclosure, an aircraft may also be provided, comprising a tubular body according to the description given above, and a system of pipes, the tubular body being connected to the system of pipes in a fluid-communicating manner.

The advantages and developments of the aircraft according to the disclosure correspond to the advantages and developments that have been given above in the description of the method. Reference is accordingly made to the description given above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the invention are described below on the basis of an embodiment that is given by way of example by means of the appended drawing, in which.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
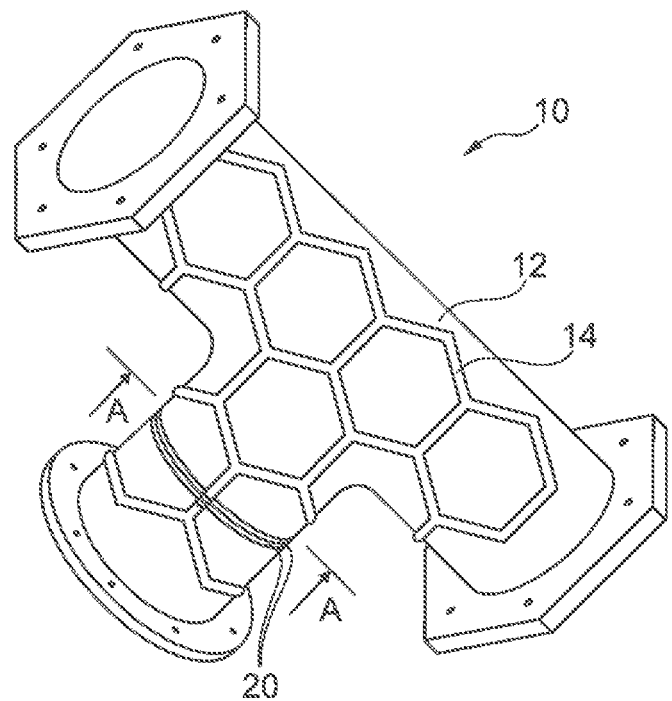
FIG. 1 shows a schematic representation of a tubular body with a stiffening structure.

FIG. 1 shows a schematic representation of a tubular body 10 in the form of a manifold, which has been produced by means of 3D printing. The tubular body 10 should be understood here as merely given by way of example, since any desired component that has a tendency to suffer from cracks or ruptures due to internal stress can be produced by the method according to the disclosure.

The tubular body 10 comprises an outer wall 12 and a stiffening structure layer 10. The stiffening structure 14 extends along the outer wall 12. As shown in FIG. 1, the stiffening structure 14 may in this case only cover part of the outer wall 12. Alternatively, the stiffening structure 14 may extend over the entire outer wall 12.

The stiffening structure 14 stiffens the outer wall 12. The outer wall 12 can therefore be made thinner than without a stiffening structure 14.

Furthermore, in a first embodiment given by way of example, the tubular body 10 may consist of titanium.

In a second embodiment given by way of example, the tubular body 10 may consist of a high-performance plastic, for example polyetheretherketone or polyetherimide.

Figure 2:
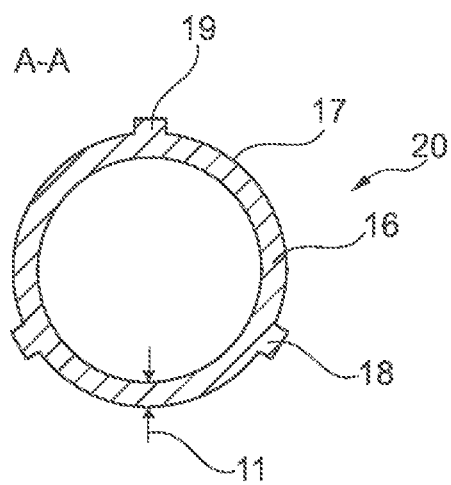
FIG. 2 shows a schematic cross-sectional representation of the tubular body that corresponds to a tubular body layer.

The tubular body 10 may be made up of at least two tubular body layers 20. In FIG. 2, a tubular body layer 20 is shown along the section A-A.

The tubular body layer 20 comprises an outer wall layer 16 with a periphery 17 and a stiffening layer 18, 19. The stiffening layer 18, 19 extends along the periphery 17 of the outer wall layer 16. Furthermore, the stiffening layer 18, 19 has at least two portions, which are spaced apart from one another. One portion of the stiffening layer 18, 19 is denoted in FIG. 2 by the reference numeral 18, the other portion of the stiffening layer 18, 19 is denoted by the reference numeral 19.

The two portions of the stiffening layer 18, 19 do not have any direct connection to one another. They are only connected to one another indirectly by way of the outer wall layer 16.

The stiffening layer 18,19 has the effect that the outer wall layer 16 can have a smaller width 11 than without a stiffening layer 18, 19. Since the internal stress may be proportional to the width 11 of the outer wall layer 16, the internal stresses in the outer wall layer 16 are reduced. By reducing the internal stresses in the outer wall layer 16, the internal stresses in the outer wall 12 are also reduced. As a result, cracks or ruptures of the tubular body 10 at the outer wall 12 are avoided.

Figure 3:
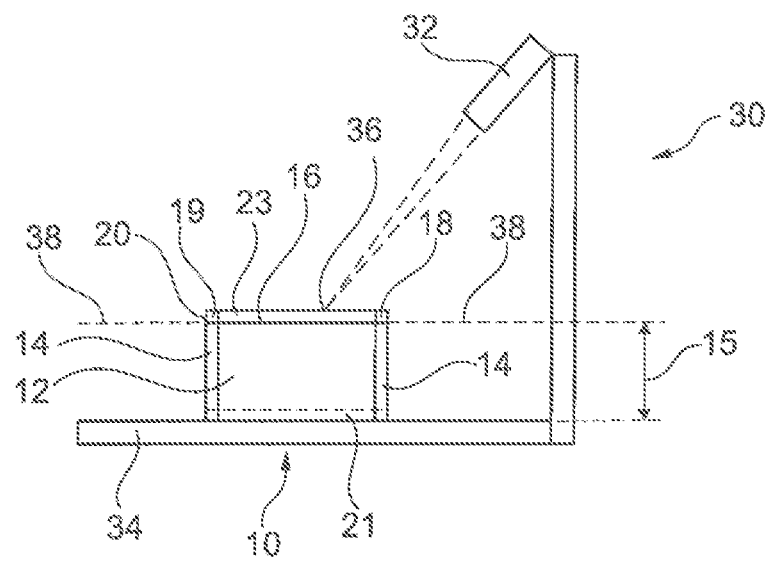
FIG. 3 shows a schematic representation of a 3D printer.

In FIG. 3, a 3D printer 30 is shown. The 3D printer 30 is represented in this case in the form of a laser 3D printer, which by means of a laser 32 focuses a laser beam on a focal point 36 in a printing plane 38. The 3D printer 30 also comprises a printing platform 34, on which a tubular body 10 is printed.

In FIG. 3 there can also be seen part of an outer wall 12 and part of a stiffening structure 14, both of which are not yet completed, i.e. are still being printed. In the printing plane 38, a tubular body layer 20 is applied to the tubular body 10 by the laser beam of the laser 32. An outer wall layer 16 is thereby applied and attached on the outer wall 12 and a stiffening structure layer 18, 19 is thereby applied and attached on the stiffening structure 14. The attachment of the outer wall layer 16 and the stiffening layer 18, 19 on the outer wall 12 and the stiffening structure 14, respectively, can be carried out in this case by means of a melting process, by the energy of the laser at the focal point 36. The focal point 36 of the laser 32 thereby travels in the printing plane 38 to the positions at which the tubular body layer 20 is to be applied.

When one tubular body layer 20 has been completed, the printing plane 38 can be adjusted. The adjustment may in this case be performed such that the printing plane 38 is moved away perpendicularly in relation to the plane of the tubular body layer 20 that was last completed, and forms a parallel plane in relation to the tubular body layer 20 outside the tubular body 10. Then, a new tubular body layer 20 can be produced on the previous tubular body layer 20. In the case of a laser 3D printer, the adjustment of the printing plane may for example take place by means of adjusting the platform 34 and/or displacing the focal point 36 of the laser 32.

By repeatedly displacing the printing plane 38 and producing the tubular body layer 20 with the outer wall layer 16 and the stiffening layer 18, 19, a tubular body 10 with an outer wall 12 that has a stiffening structure 14 can be produced layer by layer.

Also shown in FIG. 3 are a first tubular body layer 21 and a last tubular body layer 23, it also being possible that the last tubular body layer 23 is only just being produced. The first tubular body layer 21 and the last tubular body layer 23 may be at a distance 15, which may be between 50 mm and 1000 mm, preferably between 300 mm and 800 mm, more preferably between 350 mm and 600 mm, and most preferably at 400 mm. This allows for example overall heights of up to 1000 mm to be achieved for the tubular body 10 by means of the laser 3D printer 30. The overall height of the tubular body 10 is in this case only limited by the height of the printing space in the laser 3D printer 30.

Figures 4A, 4B:
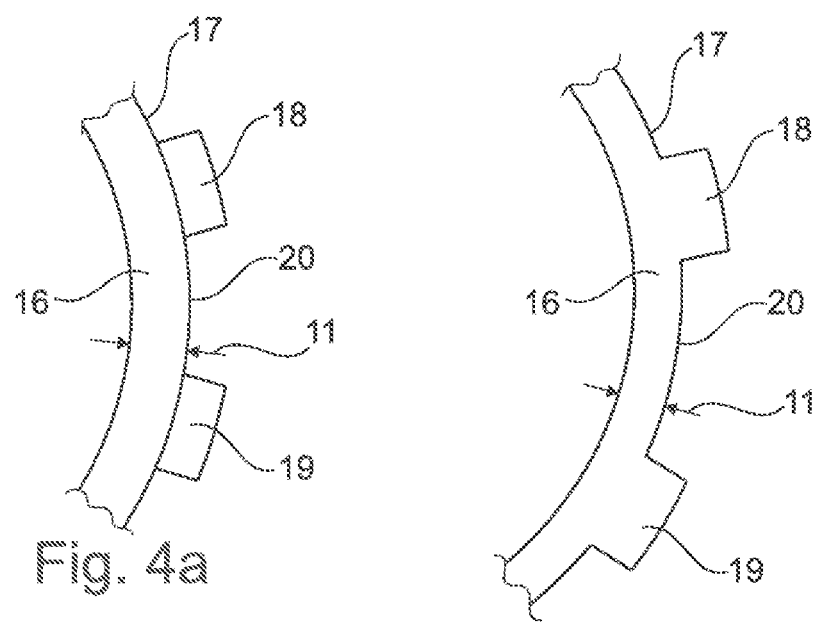
FIGS. 4a and 4b show schematic representations of tubular body layers.

FIG. 4a shows here an exemplary embodiment in which the outer wall layer 16 and the stiffening layer 18, 19 were applied individually and only after their completion were connected to one another to form the tubular body layer 20. It can also be seen here that the outer wall layer 16 does not have any kinks or folds, but rather has a smooth periphery 17. This means that the tubular body layer 20 has a greater width 11 at the positions at which the portions of the stiffening layer 18, 19 are connected to the outer wall layer 16 than between the portions of the stiffening layer 18, 19.

FIG. 4b shows a further exemplary embodiment, in which the outer wall layer 16 and the stiffening layer 18, 19 are formed in one piece. This means that there is no seam between the outer wall layer 16 and the stiffening layer 18, 19. The outer wall layer 16 and the stiffening layer 18, 19 are in this case produced in one step. Together, they form the tubular body layer 20.

If, for example, a laser 3D printer is used for the production of the tubular body layer 20 according to FIG. 4b, the focal point 36 of the laser beam of the laser 32 can travel back and forth directly between the outer wall layer 16 and one of the portions of the stiffening layer 18, 19, and thereby form the outer wall layer 16 and the corresponding portion of the stiffening layer 18, 19.

Figure 5:
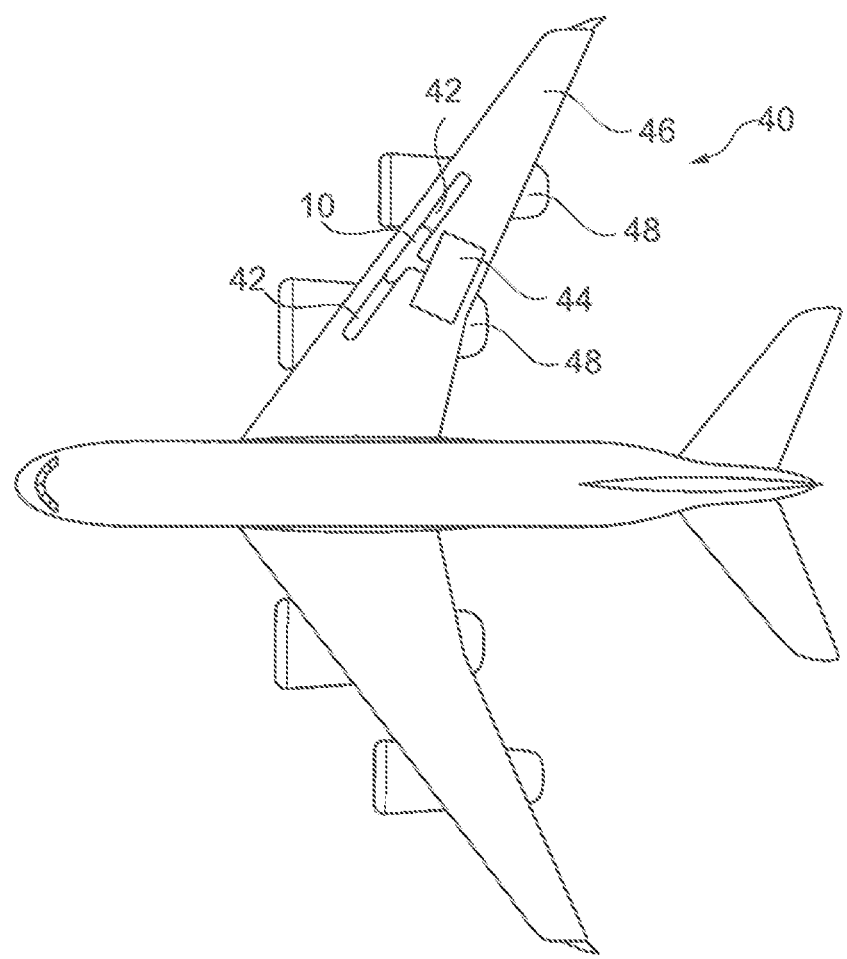
FIG. 5 shows a schematic representation of an aircraft.

FIG. 5 shows an aircraft 40. The aircraft 40 has a wing 46 and two propulsion elements 48. The propulsion elements 48 are supplied with fuel from a tank 44 by way of a system of pipes 42. The system of pipes 42 is connected to a tubular body 10, which in this example is connected to the outlet opening of the tank 44. The tubular body 10 and the system of pipes 42 are in this case connected to one another in a fluid-communicating manner, so that the fuel can be delivered from the tank 44 through the tubular body 10 and the system of pipes 42 to the propulsion elements 48.

Figure 6A:
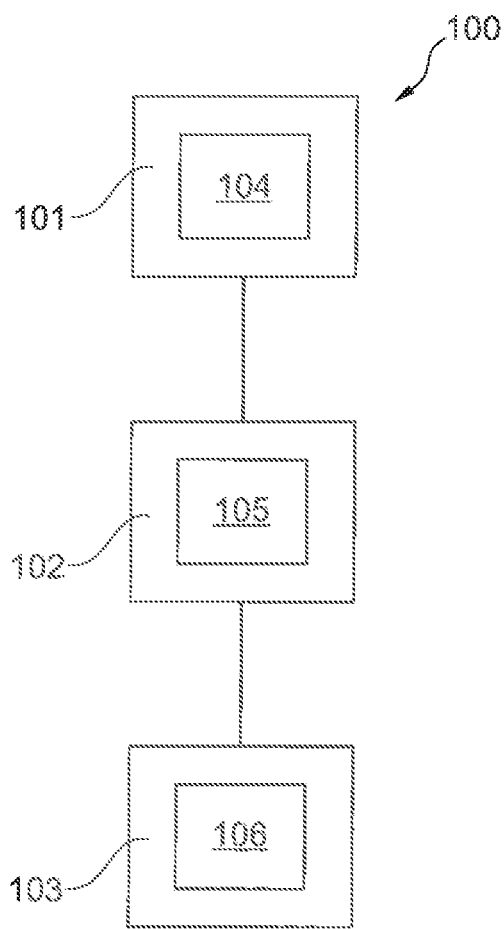
FIGS. 6a and 6b show schematic flow diagrams of the method.
Figure 6B:
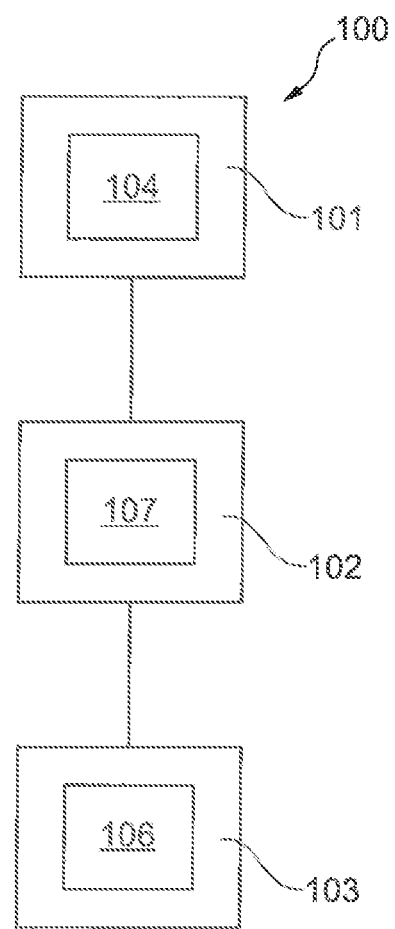

FIG. 6a shows a first exemplary embodiment of the method 100 for producing a tubular body with reduced internal stress by using 3D printing. The tubular body has in this case an outer wall with a stiffening structure. In this case, the stiffening structure extends along at least part of the outer wall.

In a first step a), a printing plane 38 is set 101 by means of a 3D printer 30. This may take place by displacing a printing platform 34 of the 3D printer 30. In a substep a1), the printing plane 38 may be set 104 by means of a 3D printer. In this case, the setting of the printing plane 38 may take place by setting a focal point 36 of a laser beam of a laser 32. The printing plane 38 is in this case set such that it is free from parts of the 3D printer 30 and from the tubular body 10 to be produced.

In a second step b), a tubular body layer 20 is printed 102 in the printing plane 38 by means of the 3D printer. The tubular body layer 20 has in this case an outer wall layer 16 and a stiffening structure layer 18, 19. The stiffening structure layer 18,19 extends in the printing plane 38 along a periphery 17 of the outer wall layer 16. The stiffening structure layer 18, 19 also has at least two portions, which are spaced apart from one another.

In a first embodiment that is given by way of example, the tubular body layer may be printed 105 from metal according to step b1). Titanium may preferably be used for this. However, other metals are also possible. In this way, a tubular body 10 can be produced from titanium by means of the method 100.

In a second embodiment that is given by way of example, the tubular body layer may be printed 107 from plastic according to step b2). In this case, the plastic may be a high-performance plastic, such as for example polyetheretherketone or polyetherimide. However, other types of plastic are also possible. For printing with plastics, a laser 3D printer is not absolutely necessary.

In a third step c), steps a) and b) may be repeated 103 until an outer wall 12 with a stiffening structure 14 for a tubular body 10 with reduced internal stress has been produced. In this case, the repetition 103 of steps a) and b) has the effect that the printing plane 38 is moved successively away from the tubular body layer 20 first produced, so that new tubular body layers 20 can be successively applied to the old tubular body layers 20.

In a substep c1), steps a) and b) may be repeated 106 until a first tubular body layer 21 is at a distance 15 from a last tubular body layer 20 of between 50 mm and 1000 mm. The distance may preferably lie between 300 mm and 800 mm, more preferably between 350 mm and 600 mm, and most preferably at 400 mm. This means that the method 100 can be used to produce a component which has at least in one dimension a measure of up to 1000 mm, this component having a low internal stress and consequently being of a very stable configuration.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for producing a tubular body with reduced internal stress by using 3D printing, the tubular body having an outer wall with a stiffening structure, the stiffening structure extending along at least part of the outer wall, the method comprising the steps of:
   a) setting a printing plane for 3D printing with a 3D printer;
   b) printing a tubular body layer in the printing plane with the 3D printer, the tubular body layer having an outer wall layer and a stiffening structure layer, the stiffening structure layer extending in the printing plane along a periphery of the outer wall layer, and the stiffening structure layer having at least two portions spaced apart from one another; and
   c) repeating steps a) and b) to produce an outer wall with a stiffening structure for a tubular body with reduced internal stress, wherein a number of stiffening structure layers form the stiffening structure by intersecting on the outer wall of the tubular body to form a hexagonal rib-like network structure with a plurality of hexagons lying on the outer wall of the tubular body.

2. The method according to claim 1, wherein the outer wall layer and the stiffening structure layer are in one piece.

3. The method according to claim 1, wherein the stiffening structure extends around the outer wall outside the tubular body.

4. The method according to claim 1, wherein the stiffening structure forms an irregularly hexagonal rib-like network structure on the outer wall of the tubular body.

5. The method according to claim 1, wherein step b) comprises the sub step of:
   b1) printing the tubular body layer from metal.

6. The method according to claim 5, wherein the metal comprises titanium.

7. The method according to claim 1, wherein step b) comprises the sub step of:
   b2) printing the tubular body layer from plastic.

8. The method according to claim 1, wherein step c) comprises the substep of:
   c1) repeating steps a) and b) until a first tubular body layer is at a distance from a last tubular body layer of between 50 mm and 1000 mm.

9. The method according to claim 1, wherein step a) comprises the substep of:
   a1) setting a printing plane for 3D printing with a laser 3D printer.

* * * * *